UNITED STATES PATENT OFFICE.

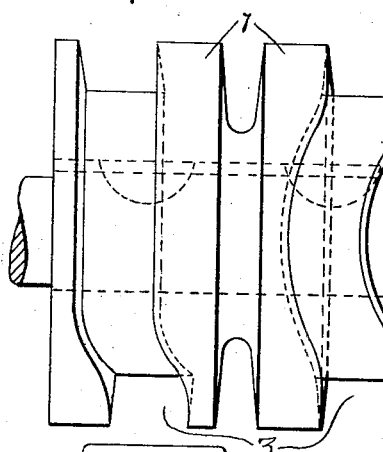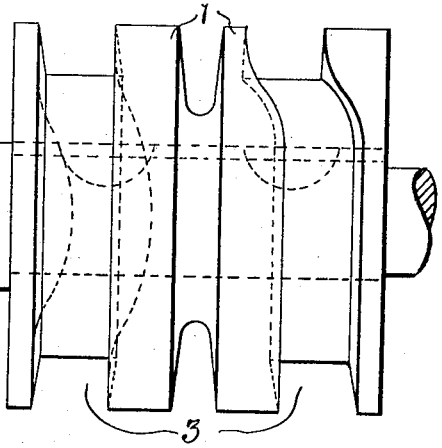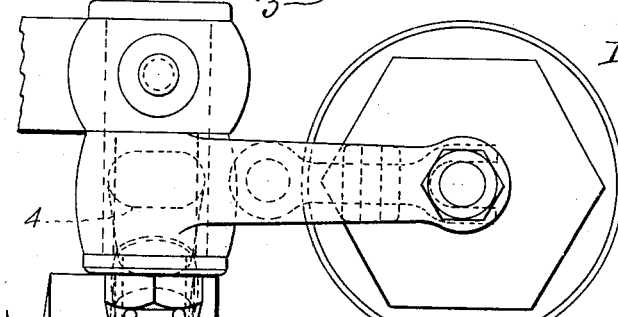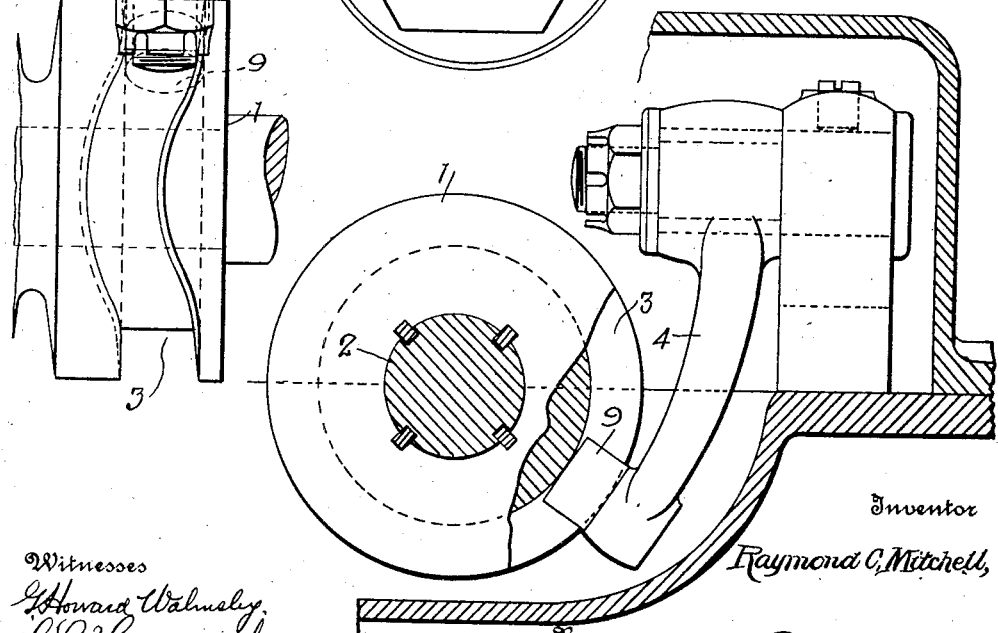

RAYMOND C. MITCHELL, OF SPRINGFIELD, OHIO.

CAM.

1,331,076.  Specification of Letters Patent.  Patented Feb. 17, 1920.

Application filed February 19, 1914. Serial No. 819,682.

*To all whom it may concern:*

Be it known that I, RAYMOND C. MITCHELL, a citizen of the United States, residing at Springfield, in the county of Clark and State of Ohio, have invented certain new and useful Improvements in Cams, of which the following is a specification, reference being had therein to the accompanying drawing.

This invention relates to cams and more particularly to cams used in connection with rock arms mounted on fixed centers, such, for example, as are employed in connection with the valve actuating devices of Patent No. 1,065,619, granted to me June 24th, 1913. In devices of this kind the cam-actuated arm has a part which enters the groove in the periphery of a cylindrical cam body and this groove is so shaped as to impart the desired movement to the rock arm. The position of the arm relatively to the cam is such that the rocking movement of the arm causes that part thereof which enters the cam groove to extend at different angles relatively thereto. If the fit between the groove and that part of the cam which extends into the same is snug enough to impart a positive, accurate motion to the arm, the parts will bind or undue friction will be caused when the arm is moved into an angular relation to the cam groove.

The object of the present invention is to so construct and shape the groove itself that it will coöperate with the cam arm to produce the desired movement of the latter without binding or undue friction between the parts.

In the accompanying drawings, Figure 1 is a side elevation of a pair of twin cams embodying my invention; Fig. 2 is a similar view taken at right angles to Fig. 1; Fig. 3 is a plan view of one of the cams with the actuating lever in position; and Fig. 4 is a side elevation of the cam and lever.

In carrying out my invention I form the groove in the cam with one or both of its side walls inclined to that face of the cam in which the groove is formed, that is, if the cam is so placed that the groove extends in a substantially horizontal position, the side wall or walls of the groove will extend at an acute angle to a vertical line passing through the groove. In different portions of the groove the side walls extend in different directions so as to accommodate the same to the movements of the cam arm, the inclination of one portion of the side wall gradually merges into the inclination of another part thereof, which inclination is in a direction different from the direction of the inclination of the first portion. Consequently, the cam arm will be gradually and smoothly moved from one position to the other. There may be two positions of the arm or there may be several positions according to the nature and extent of the movements it is desired to impart to the cam arm.

In that embodiment of the invention illustrated by the drawings I have shown the same as applied to a cylindrical rotatory cam having a cam groove in the periphery thereof and coöperating with an arm mounted on a fixed pivot at a point adjacent to the cam. In this particular embodiment the cylindrical cam is illustrated at 1 and is mounted on a shaft 2 for rotatory movement. A groove 3 is formed in the periphery of the cam and is given the shape necessary to impart the desired operation to the arm which coöperates with it. This arm is shown at 4 in the drawings and is mounted on a fixed axis extending transversely to and slightly above the axis of the cam. The lower portion of the arm is curved inwardly so that its free end extends into the groove at a point considerably below the horizontal diameter of the cam. Consequently, it will be apparent that the end of the arm which enters the groove will be moved longitudinally to the axis of the cam and in the course of this movement will be carried first to one side and then to the other side of the axis of the arm and that this movement of the arm will cause that portion thereof which enters the groove to extend first at one angle and then at another angle to the vertical plane extending through the axis of the cam. In the present construction that portion of the cam arm which enters the groove is in the form of a roller 9 which extends at an angle to the body of the arm, but this construction is optional and is merely shown as a part of this particular embodiment of the invention. Further, the cam here shown is a twin cam in which two grooves are formed, the two grooves being arranged in different circumferential positions, but it will be understood that this cam in fact comprises two cams and that it is by no means necessary that the two cams should be connected one to the other, this, again, being a feature which is peculiar to this particular embodiment of the invention.

In order that the walls of the cam groove may fit snugly about that part of the arm which enters the groove and thus impart a positive and accurately timed movement thereto and at the same time will not bind against the walls of the groove or engage these with undue friction, I have so shaped the walls of the groove that they will extend parallel or substantially parallel with that portion of the arm which enters the groove in each different position of the arm. To this end the walls of the groove are inclined to the cylindrical surface thereof, that is, they extend obliquely to a radial plane extending transversely to the axis of the cam. In the present embodiment of the invention, in which the end of the arm moves first to one side of its axis and then to the other, different portions of the cam groove are inclined in different directions but it will be understood that the direction, as well as the degree of inclination, will depend upon the particular embodiment of the invention and the amount of movement which it is desired to impart to the arm.

The construction and operation of the invention will be readily understood from the foregoing description and I wish it to be understood that while I have shown and described one embodiment of my invention, this is chosen for the purposes of illustration only and I do not desire to be limited to the details of construction shown and described, for obvious modifications will occur to a person skilled in the art.

Having thus fully described my invention, what I claim as new and desire to secure by Letters Patent, is:—

In a mechanism of the character described, a rotatable cylinder provided with a cam groove therearound having curved portions, a fixed bearing mounted to one side of said cylinder, an arm journaled in said bearing on an axis at right angles to the axis of said cylinder and at one side thereof, said arm extending across the plane of the axis of said cylinder to the opposite side thereof and provided with a finger arranged at an angle thereto engaging said groove on the last-mentioned side of said axis, the walls of said groove being arranged obliquely to the surface of the cylinder so as to cause them to engage and extend substantially parallel with said finger during the complete movement thereof.

In testimony whereof I affix my signature in presence of two witnesses.

RAYMOND C. MITCHELL.

Witnesses:
W. W. WITMEYER,
JOHN B. McGREW.